(12) United States Patent
Ohara

(10) Patent No.: US 8,272,666 B2
(45) Date of Patent: Sep. 25, 2012

(54) COLUMN-MOUNTED KNEE AIRBAG DEVICE

(75) Inventor: Koji Ohara, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/387,263

(22) PCT Filed: Jul. 29, 2009

(86) PCT No.: PCT/JP2009/063481
§ 371 (c)(1),
(2), (4) Date: Mar. 2, 2012

(87) PCT Pub. No.: WO2011/013211
PCT Pub. Date: Feb. 3, 2011

(65) Prior Publication Data
US 2012/0153601 A1    Jun. 21, 2012

(51) Int. Cl.
*B60R 21/20* (2011.01)
*B60R 21/206* (2011.01)
(52) U.S. Cl. .................... 280/728.2; 280/730.1
(58) Field of Classification Search ............. 280/728.2, 280/730.1, 731, 732
See application file for complete search history.

(56) References Cited

U.S. PATENT DOCUMENTS

| | | | |
|---|---|---|---|
| 6,302,437 B1 * | 10/2001 | Marriott et al. ............... | 280/732 |
| 6,715,789 B2 * | 4/2004 | Takimoto et al. .......... | 280/730.1 |
| 6,929,281 B2 * | 8/2005 | Loeper et al. .............. | 280/728.3 |
| 7,367,587 B2 * | 5/2008 | Taoka ........................ | 280/751 |
| 7,549,671 B2 * | 6/2009 | Mizuno et al. ............. | 280/730.1 |
| 7,600,776 B2 | 10/2009 | Hoshino et al. | |
| 7,722,076 B2 | 5/2010 | Fukawatase et al. | |
| 7,823,911 B2 | 11/2010 | Adachi et al. | |
| 7,878,532 B2 * | 2/2011 | Sasaki et al. .............. | 280/730.1 |
| 7,997,610 B2 | 8/2011 | Fukawatase et al. | |
| 8,056,922 B2 * | 11/2011 | Mitsuo et al. ............. | 280/728.2 |
| 8,146,943 B2 * | 4/2012 | Fukawatase et al. ........ | 280/739 |
| 2002/0084634 A1 | 7/2002 | Adomeit et al. | |
| 2008/0174091 A1 | 7/2008 | Hoshino et al. | |
| 2009/0174173 A1 | 7/2009 | Adachi et al. | |
| 2010/0327566 A1 * | 12/2010 | Matsushima ............. | 280/728.2 |
| 2011/0049847 A1 * | 3/2011 | Adachi et al. ............. | 280/730.1 |

(Continued)

FOREIGN PATENT DOCUMENTS

JP      A-11-59309      3/1999

(Continued)

OTHER PUBLICATIONS

International Search Report dated Sep. 15, 2009 in International Application No. PCT/JP2009/063481 (with translation).

(Continued)

*Primary Examiner* — Joseph Rocca
*Assistant Examiner* — James English
(74) *Attorney, Agent, or Firm* — Oliff & Berridge, PLC

(57) ABSTRACT

An airbag module is stored within a column lower cover of a steering column. The airbag module is structured to include a supporting plate, an inflator, and a knee airbag. A gap is formed between a lower surface of the knee airbag and the column lower cover. Ribs are formed to project at inner side surfaces of corner portions of the column lower cover. The ribs are pressed against the knee airbag and are made to be an interfering design.

10 Claims, 10 Drawing Sheets

U.S. PATENT DOCUMENTS

2011/0156378 A1* 6/2011 Matsushima et al. ...... 280/730.1

FOREIGN PATENT DOCUMENTS

| | | |
|---|---|---|
| JP | A-2002-127863 | 5/2002 |
| JP | A-2003-501308 | 1/2003 |
| JP | A-2008-110704 | 5/2008 |
| JP | A-2008-120156 | 5/2008 |
| JP | A-2008-120290 | 5/2008 |
| JP | A-2008-149930 | 7/2008 |
| JP | A-2008-174086 | 7/2008 |
| JP | A-2008-179295 | 8/2008 |
| JP | A-2008-221925 | 9/2008 |
| JP | A-2009-154603 | 7/2009 |
| WO | WO 2008/110880 A1 | 9/2008 |

OTHER PUBLICATIONS

Reply to Written Opinion of the International Searching Authority issued in International Application No. PCT/JP2009/063481 on Sep. 15, 2009 (with translation).

* cited by examiner

COLUMN-MOUNTED KNEE AIRBAG DEVICE

TECHNICAL FIELD

The present invention relates to a column-mounted knee airbag device that, at the time of a front collision or a time when a front collision is predicted, inflates and expands a knee airbag toward a steering column lower side and restrains the knees of a vehicle occupant.

BACKGROUND ART

There are proposed various steering devices in which a knee airbag device is incorporated within the column cover of a steering column for the purpose of protecting the both knees of a vehicle occupant (the driver) at the time of a front collision (as examples, refer to Patent Documents 1, 2 and the like).

Patent Document 1: Japanese Patent Application Laid-Open No. 2008-110704
Patent Document 2: Japanese Patent Application Laid-Open No. 2008-120290
Patent Document 3: Japanese Patent Application Laid-Open No. 2008-120156
Patent Document 4: Japanese Patent Application Laid-Open No. 2008-179295

DISCLOSURE OF INVENTION

Technical Problem

By the way, there is usually the need to make the column cover as thin as possible, from the standpoints of the vehicle occupant's operation of the pedal and the appearance. On the other hand, the steering column for steering operation is disposed within the column cover, and the space in which an airbag module, such as a knee airbag and an inflator, can be disposed is limited. In such a situation, there are cases in which space between the column cover and the knee airbag cannot be sufficiently ensured, and the both contact due to inconsistencies, such as manufacturing errors or assembly errors or the like of the respective parts, and abnormal noise arises.

To describe further, there is the need to design while taking into consideration dimensional inconsistencies in production such as manufacturing errors and assembly errors of the respective parts, even under the current constraint that a sufficient gap cannot be ensured between the column cover and the knee airbag. Therefore, the knee airbag device and the column cover are designed such that a slight gap is formed between the column cover and the knee airbag. Because there is this gap, when the steering column vibrates in the vehicle vertical direction due to vehicle body vibrations or the like that are inputted from the road surface when the vehicle travels, the sound of the knee airbag hitting the column lower cover or the sound of the knee airbag rubbing against the inner side surface of the column lower cover is generated as abnormal noise.

In view of the above-described circumstances, an object of the present invention is to obtain a column-mounted knee airbag device that can suppress or prevent the occurrence of abnormal noise due to contact between a storage member and a knee airbag, even if there are inconsistencies such as manufacturing errors, assembly errors, or the like of respective parts.

Solution to Problem

A column-mounted knee airbag device relating to a first aspect comprises: an airbag module structured to include a knee airbag that is disposed in a folded-up state at a lower rear end side of a steering column and that is inflated and expanded toward a lower side of the steering column due to gas being supplied; a storage member that stores the airbag module between the storage member and the steering column, in a state in which there is a gap between the storage member and a lower surface of the knee airbag; and a plurality of storage member side projecting portions that are provided at a surface of the storage member, which surface faces the knee airbag, the projecting heights of the projecting portions from the facing surface set to be higher than a gap dimension of the gap and the projecting portions being pressed against the knee airbag that is in the folded-up state.

A column-mounted knee airbag device relating to a second aspect has the feature that, in the first aspect, the storage member is a column lower cover that covers a lower rear end side of the steering column and is structured to include a bottom portion and both side portions, and the storage member side projecting portions are provided at corner portions at which the bottom portion and the side portions at the column lower cover are connected.

A column-mounted knee airbag device relating to a third aspect has the feature that, in the second aspect, a rupture starting point portion, that ruptures when inflation pressure of the knee airbag that is applied to the bottom portion reaches a predetermined value and unfolds airbag doors toward an outer side of the column lower cover, is set at a central side of the bottom portion of the column lower cover, the corner portions are structured as regions that connect the bottom portion and the side portions at the column lower cover, and further, the storage member side projecting portions are set at least to corner final end portions at rupture starting point portion sides of the corner portions.

A column-mounted knee airbag device relating to a fourth aspect has the feature that, in the second aspect or the third aspect, surfaces, at a knee airbag side, of the storage member side projecting portions are structured by inclined surfaces that are inclined such that inner ends are positioned further toward a column lower side than outer ends, as seen from an axial direction of the steering column.

A column-mounted knee airbag device relating to a fifth aspect comprises: an airbag module structured to include a knee airbag that is disposed in a folded-up state at a lower rear end side of a steering column and that is inflated and expanded toward a lower side of the steering column due to gas being supplied, and a supporting body that is supported at the steering column and to which the knee airbag is fixed; a storage member that covers the airbag module from a column lower side and that stores the knee airbag between the storage member and the supporting body; and a plurality of supporting body side projecting portions that are provided at a surface of the supporting body, which surface faces the knee airbag, and that project toward a storage member side, the projecting heights of the projecting portions from the facing surface set to be higher than a gap dimension of a gap between a top surface of the knee airbag and the supporting body, and that are pressed against the knee airbag that is in the folded-up state.

A column-mounted knee airbag device relating to a sixth aspect has the feature that, in the fifth aspect, the storage member is a column lower cover that covers a lower rear end side of the steering column and is structured to include a bottom portion and both side portions, and a plurality of storage member side projecting portions, that are pressed against the knee airbag that is in the folded-up state, are provided at a surface of the column lower cover, which surface faces the knee airbag.

A column-mounted knee airbag device relating to a seventh aspect has the feature that, in the sixth aspect, the storage member side projecting portions are provided at corner portions at which the bottom portion and the side portions at the column lower cover are connected.

A column-mounted knee airbag device relating to an eighth aspect has the feature that, in the seventh aspect, a rupture starting point portion, that ruptures when inflation pressure of the knee airbag that is applied to the bottom portion reaches a predetermined value and unfolds airbag doors toward an outer side of the column lower cover, is set at a central side of the bottom portion of the column lower cover, the corner portions are structured as regions that connect the bottom portion and the side portions at the column lower cover, and further, the storage member side projecting portions are set at least to corner final end portions at rupture starting point portion sides of the corner portions.

A column-mounted knee airbag device relating to a ninth aspect has the feature that, in any one aspect of the sixth aspect through the eighth aspect, surfaces, at a knee airbag side, of the storage member side projecting portions are structured by inclined surfaces that are inclined such that inner ends are positioned further toward a column lower side than outer ends, as seen from an axial direction of the steering column.

A column-mounted knee airbag device relating to a tenth aspect has the feature that, in any one aspect of the first aspect through the ninth aspect, the knee airbag has a pair of roll-folded portions that are roll-folded such that respective central lines of rolling are disposed substantially parallel to the steering column, and the airbag module is structured to include the knee airbag, and a gas generating means that is formed in a solid cylindrical shape and is disposed between the pair of roll-folded portions and generates gas by operating.

In accordance with the first aspect, the knee airbag of the airbag module is stored, in a folded-up state, between the steering column and the storage member. When gas is supplied to the knee airbag that is in this state, the knee airbag is inflated and expanded toward the steering column lower side. Note that, in the non-operating state of the column-mounted knee airbag device, a gap exists between a lower surface of the knee airbag and the storage member.

Here, in a case in which the plural storage member side projecting portions of the present invention are not provided, when vibrations at the time when the vehicle travels are transmitted to the airbag module via the steering column, abnormal noise due to the knee airbag hitting the storage member or the knee airbag rubbing against the storage member arises.

However, in the present invention, because the plural storage member side projecting portions, the projecting heights of the projecting portions from the facing surface set to be higher than a gap dimension of the gap, are provided at a surface of the storage member, which surface faces the knee airbag, and these storage member side projecting portions are pressed against the knee airbag that is in the folded-up state, the knee airbag and the storage member are an interfering design. Therefore, even if there is a gap between the knee airbag and the storage member, the knee airbag is not displaced into this gap. Accordingly, the knee airbag hitting the storage member and the knee airbag rubbing against the storage member are suppressed or eliminated.

Further, as described above, because there is the gap between the knee airbag in the folded-up state and the storage member, a gap, that is necessary in a design that takes into consideration inconsistencies in the production of the parts such as the knee airbag and the like, also is ensured.

In accordance with the second aspect, because the storage member is made to be the column lower cover that covers a lower rear end side of the steering column, and the storage member side projecting portions are provided at corner portions at which the bottom portion and the side portions of the column lower cover are connected, it is difficult for sink marks (depressions) and whitening of the design surface side to become noticeable.

In accordance with the third aspect, when the inflation pressure of the knee airbag is applied to the bottom portion of the column lower cover, and this inflation pressure reaches a predetermined value, the column lower cover ruptures from the rupture starting point portion that is set at the central side of this bottom portion, and the airbag doors are unfolded toward the outer side of the column lower cover.

Here, the corner portions of the column lower cover are structured as regions that connect the bottom portion and the side portions, and, in the present invention, in this case, the storage member side projecting portions are set at least to the rupture starting point portion sides of the corner portions. Therefore, it is easy for stress, that is due to the inflation pressure of the knee airbag, to concentrate at the rupture starting point portion. When short storage member side projecting portions, that do not reach the connected regions of the corner portions and the bottom portion (i.e., the corner final end portions at the rupture starting point portion sides) are set, the surface rigidity only increases at the ranges in which the storage member side projecting portions are set, and therefore, the stress due to the inflation pressure of the knee airbag is applied to the entirety of the portion where the surface rigidity is relatively low, and there is little stress that is applied to the rupture starting point portion. In contrast, if the storage member side projecting portions are set to the corner final end portions at the rupture starting point portion sides, the surface rigidity is high in those ranges, and therefore, it is easier by that much for stress to concentrate at the rupture starting point portion. Note that, if the storage member side projecting portions are set closer to the rupture starting point portion side, the surface rigidity increases more, and stress concentrates more at the rupture starting point portion by that much, but if the storage member side projecting portions are excessively extended, another problem of the storage space of the knee airbag decreasing too much arises. Accordingly, extending to the corner final end portions at the rupture starting point portion sides can strike a balance between improving the surface rigidity and ensuring the storage space, and is ideal.

In accordance with the fourth aspect, the surfaces, at the knee airbag side, of the storage member side projecting portions are structured by inclined surfaces that are inclined such that inner ends are positioned further toward a column lower side than outer ends, as seen from an axial direction of the steering column. Therefore, when the knee airbag that is in the folded-up state inflates within the storage member, the knee airbag does not catch on the storage member side projecting portions. Further, the knee airbag that inflates and expands does not catch on the storage member side projecting portions during the unfolding of the airbag doors after the rupture starting point portion ruptures. Accordingly, the expansion behavior of the knee airbag from the start of expansion until the completion of expansion is stable.

In accordance with the fifth aspect, the knee airbag of the airbag module is fixed to the supporting body that is supported at the steering column, and the knee airbag is stored in the folded-up state between that supporting body and the storage member. When gas is supplied to the knee airbag that is in this state, the knee airbag is inflated and expanded toward the steering column lower side. Note that, in the non-operating state of the column-mounted knee airbag device, a gap exists between a lower surface of the knee airbag and the storage member.

Here, in a case in which the plural supporting body side projecting portions of the present invention are not provided, when vibrations at the time when the vehicle travels are transmitted to the airbag module via the steering column, abnormal noise due to the knee airbag hitting the storage member or the knee airbag rubbing against the storage member arises.

However, in the present invention, the plural supporting body side projecting portions, that project toward the storage member side the projecting heights of the projecting portions from the facing surface set to be higher than a gap dimension of a gap between a top surface of the knee airbag and the supporting body, are provided at the surface of the supporting body which surface faces the knee airbag, and these supporting body side projecting portions are pressed against the knee airbag that is in the folded-up state. Therefore, the knee airbag is pressed toward the storage member side. Thus, no gap arises between the knee airbag and the storage member. Accordingly, the knee airbag hitting the storage member and the knee airbag rubbing against the storage member are suppressed or eliminated.

Further, due to the plural supporting body side projecting portions, that project toward the storage member side, being provided at the surface of the supporting body which surface faces the knee airbag, a gap corresponding to the amount of projection of the supporting body side projecting portions is formed between the knee airbag and the supporting body. Accordingly, a gap, that is necessary in a design that takes into consideration inconsistencies in the production of the parts such as the knee airbag and the like, also is ensured.

In accordance with the sixth aspect, the storage member is made to be the column lower cover. Further, because the plural storage member side projecting portions are provided at the surface of the column lower cover, which surface faces the knee airbag, and these storage member side projecting portions are pressed against the knee airbag that is in the folded-up state, the knee airbag and the storage member are an interfering design. Therefore, even if there is a gap between the knee airbag and the storage member, the knee airbag is not displaced into this gap. Accordingly, combined with the supporting body side projecting portions that are provided at the supporting body side, the knee airbag hitting the storage member and the knee airbag rubbing against the storage member are suppressed or eliminated.

In accordance with the seventh aspect, the same operation as the above-described second aspect is obtained. In accordance with the eighth aspect, the same operation as the above-described third aspect is obtained. In accordance with the ninth aspect, the same operation as the above-described fourth aspect is obtained.

In accordance with the column-mounted knee airbag device relating to the tenth aspect, because the knee airbag has a pair of roll-folded portions that are roll-folded such that respective central lines of rolling are disposed substantially parallel to the steering column, the knee airbag is inflated and expanded at both vehicle transverse direction sides with the steering column as the center. Accordingly, even if the gap between the both knees of the vehicle occupant and the instrument panel is narrow, the knee airbag is inflated and expanded rapidly in this gap.

Further, because the gas generating means is formed in a solid cylindrical shape and is disposed between the pair of roll-folded portions, or in other words, because the gas generating means is so-called longitudinally disposed such that the longitudinal direction thereof is substantially parallel to the axis of steering column, it is easy to ensure space for setting the gas generating means (the installation ability is good) at the narrow space between the steering column and the storage space. Further, because the gas jetting-out portion of the gas generating means is disposed between the pair of roll-folded portions, gas is supplied equally to the pair of roll-folded portions, even if a flow adjusting means such as a diffuser or the like is not used. Accordingly, no left-right difference arises in the inflation pressure of the knee airbag.

Advantageous Effects of the Invention

As described above, the column-mounted knee airbag device relating to the first aspect has the excellent effect of being able to suppress or prevent the occurrence of abnormal noise due to contact between a storage member and a knee airbag, even if there are inconsistencies such as manufacturing errors, assembly errors, or the like of respective parts.

The column-mounted knee airbag device relating to the second aspect has the excellent effect of being able to obtain the effect that is due to the first aspect, without marring the quality of the external appearance.

The column-mounted knee airbag device relating to the third aspect has the excellent effect that the airbag doors can be unfolded rapidly.

The column-mounted knee airbag device relating to the fourth aspect has the excellent effect that a vehicle occupant knee restraining performance that is stable is obtained.

The column-mounted knee airbag device relating to the fifth aspect has the excellent effect of being able to suppress or prevent the occurrence of abnormal noise due to contact between a storage member and a knee airbag, even if there are inconsistencies such as manufacturing errors, assembly errors, or the like of respective parts.

The column-mounted knee airbag device relating to the sixth aspect has the excellent effect that the effect of suppressing or preventing the occurrence of abnormal noise due to contact between a storage member and a knee airbag is obtained at both the supporting body side and the column lower cover side.

The column-mounted knee airbag device relating to the seventh aspect has the same effects as the above-described second aspect. The column-mounted knee airbag device relating to the eighth aspect has the same effects as the above-described third aspect. The column-mounted knee airbag device relating to the ninth aspect has the same effects as the above-described fourth aspect.

The column-mounted knee airbag device relating to the tenth aspect has the excellent effects that the installation ability into a steering column is good, and further, the both knees of a vehicle occupant can be restrained rapidly and by pressures that are uniform at the left and the right even if the gap between the both knees of the vehicle occupant and the instrument panel is narrow.

BEST MODES FOR CARRYING OUT THE INVENTION

First Embodiment

A first embodiment of a column-mounted knee airbag device relating to the present invention is described hereinafter by using FIG. 1 through FIG. 3. Note that arrow FR that is shown appropriately in these drawings indicates a vehicle front side, arrow UP indicates a vehicle upper side, and arrow IN indicates a vehicle transverse direction inner side.

Figure 1:
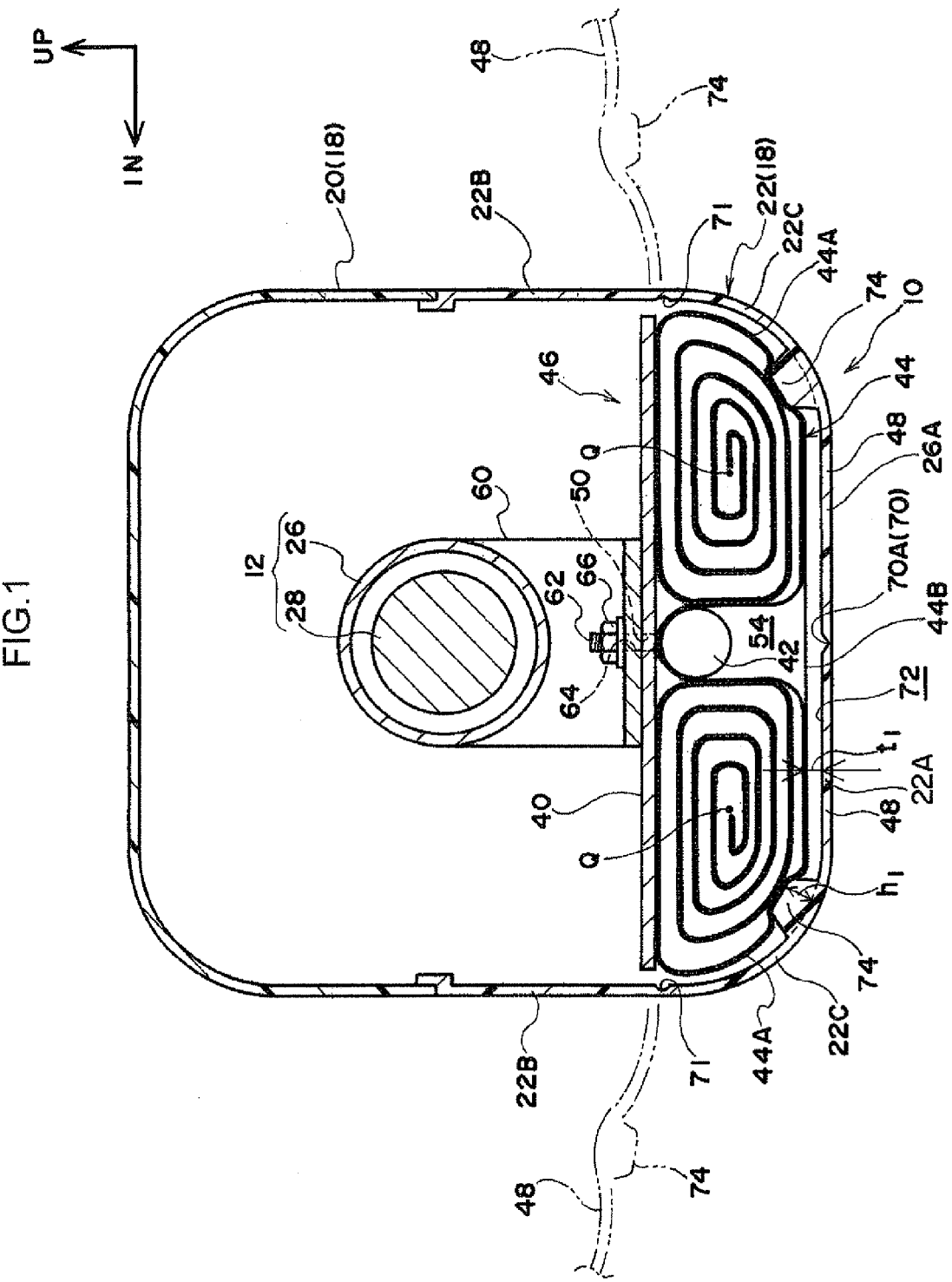
FIG. 1 is a vertical sectional view showing a state of being cut in a plane that is orthogonal to a column axial direction of a column-mounted knee airbag device relating to a first embodiment.

In FIG. 1, a column-mounted knee airbag device relating to the present embodiment (non-operated state) is shown in a state of being cut in a plane that is orthogonal to the axis of a steering column. Further, in FIG. 2, a state in which this column-mounted knee airbag device has operated is shown in a state of being cut in a plane that includes the axis of the steering column.

As shown in these drawings, an opening portion 16 for steering column insertion-through is formed in a driver's seat side of an instrument panel 14, and, through this opening portion 16, a steering column 12 is disposed in a forwardly-inclined state. Further, a column cover 18 made of resin, that covers the rear end side of the steering column 12, is disposed in a state of projecting-out toward a cabin 19 side at a position facing the opening portion 16 of the instrument panel 14. The column cover 18 is a structure that is divided into two portions vertically, and is structured by a column upper cover 20, that covers the upper portion of the column rear end side, and a column lower cover 22, that serves as a storage member and covers the lower portion of the column rear end side. Further, the instrument panel 14 as well is a structure that is divided into two portions vertically, and is structured by an instrument panel upper 14A, that is positioned at the upper side of the column upper cover 20, and an instrument panel lower 14B, that is positioned at the lower side of the column lower cover 22.

The steering column 12 has a column tube 26 that is cylindrical tube shaped. A steering main shaft 28 is supported so as to rotate freely at the axis central portion of the column tube 26. A steering wheel 30, to which the steering force of the driver is imparted, is fastened and fixed by nuts to the rear end portion of the steering main shaft 28.

(Overall Structure of Column-Mounted Knee Airbag Device 10)

The overall structure of a column-mounted knee airbag device 10 relating to the present embodiment is described next.

The column-mounted knee airbag device 10 is disposed at the lower portion of the rear end side of the above-described column tube 26. The column-mounted knee airbag device 10 is structured by an airbag module 46 that is structured to include a supporting plate 40 that is made of metal and serves as a supporting body, a cylinder-type inflator 42 that serves as a gas generating means and is formed in a substantially solid cylindrical shape and is disposed at the center of the supporting plate 40, and a knee airbag 44 that is stored in a folded-up state between the supporting plate 40 and the column lower cover 22, and airbag doors 48 that close the lower surface side of this airbag module 46.

The supporting plate 40 is formed in a rectangular plate shape. Further, the supporting plate 40 is disposed so as to be parallel to and separated downward from the axis of the column tube 26. Moreover, a pair of bolt insert-through holes 50 (see FIG. 1) are formed in the central portion of the supporting plate 40 along the axial direction of the steering column 12.

The inflator 42 has a main body portion 42A that is solid-cylindrical and in which are accommodated functional parts such as an ignition device and a gas generating agent or high pressure gas or the like, and a gas jetting-out portion 42B that projects-out coaxially from one end portion in the axial direction of this main body portion 42A and has a smaller diameter than the main body portion 42A. Plural gas jetting-out holes 52 are formed in the peripheral wall of the gas jetting-out portion 42B, and gas is jetted-out from these gas jetting-out holes 52. Note that a diffuser (flow adjusting means) that adjusts the flow of gas is disposed as needed at the periphery of the gas jetting-out portion 42B of the inflator 42.

The above-described inflator 42 is disposed at the central portion of the supporting plate 40 such that the axis thereof is parallel to the axis of the column tube 26. Namely, this airbag module 46 is a so-called longitudinally-disposed inflator type.

The knee airbag 44 is formed to a size that can cover the both knees of the vehicle occupant from the vehicle front side when inflated and expanded. As shown in FIG. 1, the knee airbag 44 is stored in the folded-up state in a storage space 54 that is formed by the supporting plate 40 and the column lower cover 22 that is described later. The knee airbag 44 in the folded-up state is structured by a pair of roll-folded portions 44A that are roll-folded such that respective central lines Q of rolling thereof are disposed substantially parallel to the axis of the column tube 26, and an intermediate portion 44B that connects these roll-folded portions 44A. The inflator 42 is disposed so as to be sandwiched between the left and right roll-folded portions 44A.

Note that, in FIG. 1, the both side portions of the knee airbag 44 are made to be the pair of roll-folded portions 44A that are folded-up by roll-folding, but are not limited to the same, and may structure a pair of folded-up portions by bellows-folding, or the both may be combined.

Figure 2:
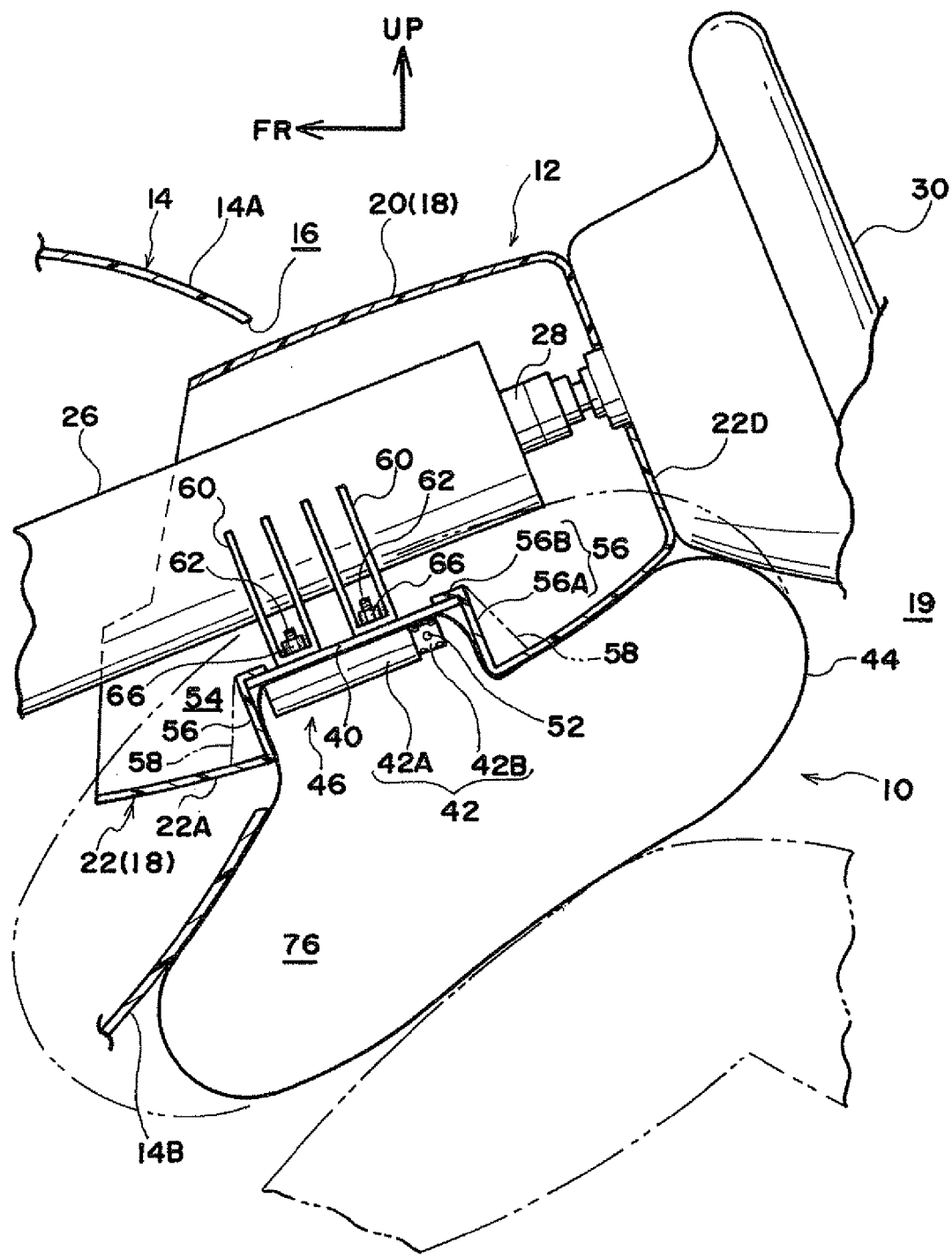
FIG. 2 is a vertical sectional view showing, in side view, the overall structure of the column-mounted knee airbag device shown in FIG. 1.

On the other hand, as shown in FIG. 2, a pair of vertical walls 56 are provided to stand adjacent to the front and rear edges of the supporting plate 40, at the reverse surface side of the column lower cover 22 (the side that faces the outer peripheral surface of the column tube 26). The vertical sectional shape of each of the vertical walls 56 is L-shaped. The airbag module 46 that includes the supporting plate 40 is disposed at the inner side of this pair of front and back vertical walls 56. In the state in which the airbag module 46 is disposed, perpendicular walls 56A of the vertical walls 56 face the knee airbag 44 that is in the folded-up state, and the front and rear edges of the supporting plate 40 are in a state of being anchored to bent portions 56B that are formed at the upper ends of the perpendicular walls 56A. Note that, in FIG. 2, the vertical walls 56 are formed in L shapes, but are not limited to the same, and may be made to be only the perpendicular walls 56A. In this case, plural ribs 58 (illustrated by the imaginary lines in FIG. 2), that are substantially right triangular and span between the perpendicular walls 56A and a bottom portion 22A, may be provided to stand such that the pressure at the time of inflation of the knee airbag 44 can be supported.

The above-described airbag module 46 is mounted to the outer peripheral surface of the lower portion of the column tube 26 via mounting brackets 60. Concretely, a pair of front and rear stud bolts 62 are provided to stand at the main body portion 42A of the inflator 42, along the axis of the column tube 26. The bolt insert-through holes 50 (see FIG. 1), that are for the stud bolts 62 to be inserted therethrough, are formed in the supporting plate 40. The mounting brackets 60 are respectively disposed at the positions at which the stud bolts 62 stand. The mounting brackets 60 are formed in substantial U shapes as seen from the vehicle transverse direction. The both end portions of the mounting brackets 60 are cut-out in arc shapes so as to correspond to the outer peripheral surface of the column tube 26, and are fixed by welding or the like to this outer peripheral surface. Further, bolt insert-through holes 64 (see FIG. 1) through which the stud bolts 62 can be inserted are formed in the intermediate portions of the mounting brackets 60. Then, the intermediate portions of the mounting brackets 60 are disposed in a state of abutting the top surface (the surface that faces the outer peripheral surface of the column tube 26) of the supporting plate 40, and the stud bolts 62 are inserted through the bolt insert-through holes 50, 64, and are fixed by nuts 66. Due thereto, the supporting plate 40, the inflator 42, and the knee airbag 44 are fastened together to the mounting brackets 60 in a state in which the intermediate portion 44B of the knee airbag 44 is nipped between the supporting plate 40 and the inflator 42.

Note that the above-described pair of mounting brackets 60 may be structured by a single part. Further, the airbag module 46 may be fixed to the column tube 26 without using the mounting brackets 60. For example, a method may be employed in which the stud bolts 62 of the inflator 42 are inserted-through the bolt insert-through holes 50 of the supporting plate 40 and thereafter fixed by the nuts 66, and a separate mounting bracket, that is formed in a substantial M shape as seen in the column axial direction, is disposed at a position that does not interfere with the stud bolts 62, and the intermediate portion of this mounting bracket is welded to the outer peripheral surface of the column tube 26, and another pair of stud bolts is provided to stand from the supporting plate 40, and these stud bolts are fixed by fastening by nuts to the both leg portions of the substantially M-shaped mounting bracket.

(Structure of Main Portions of Column-Mounted Knee Airbag Device 10)

The structure of the column lower cover 22, that serves as a storage member and is provided with the structures of main portions of the present embodiment, is described next.

As shown in FIG. 1 and FIG. 2, the column lower cover 22 has the bottom portion 22A that is disposed substantially parallel to the supporting plate 40, a pair of left and right side portions 22B that extend from the both transverse direction end portions of the bottom portion 22A in parallel toward the vehicle upper side, a pair of left and right corner portions 22C that, by arc-shaped surfaces, connect the both transverse direction end portions of the bottom portion 22A and the lower end portions of the both side portions 22B, and a rear wall portion 22D that is provided to stand from the rear end portion of the bottom portion 22A.

The airbag doors 48 are disposed at the region of the bottom portion 22A which region faces the airbag module 46. Concretely, a groove-shaped rupture portion (tear portion) 70, that is formed in the shape of an "H" shape turned sideways in plan view, is formed in the surface of the bottom portion 22A which surface faces the airbag module 46. The rupture portion 70 is structured by a pair of front and back lateral direction rupture portions (not shown) that are disposed so as to be apart in the axial direction of the steering column 12 and extend in the vehicle transverse direction, and a longitudinal direction rupture portion 70A that is disposed parallel to the axis of the column tube 26 and connects the intermediate portions of the pair of lateral direction rupture portions and serves as the rupture starting point portion.

The longitudinal direction rupture portion 70A is disposed at the central portion of the bottom portion 22A. Further, the lateral direction rupture portions are formed in a range from the bottom portion 22A to the corner portions 22C. Note that hinges 71 formed by concave grooves are formed in vicinities of the regions of connection between the corner portions 22C and the side portions 22B. Due thereto, when the bottom portion 22A of the column lower cover 22 proceeds to rupture along the rupture portion 70, the airbag doors 48 are unfolded toward both vehicle transverse direction sides with the hinges 71 as the centers.

The airbag module 46 is stored in the storage space 54 that is formed by the column lower cover 22 of the above-described structure and the supporting plate 40. A gap 72 of a gap dimension t1 is formed between the bottom surface of the knee airbag 44 that is in the folded-up state and the inner side surface of the column lower cover 22, in the state in which the airbag module 46 is stored within the column lower cover 22.

Figure 3:
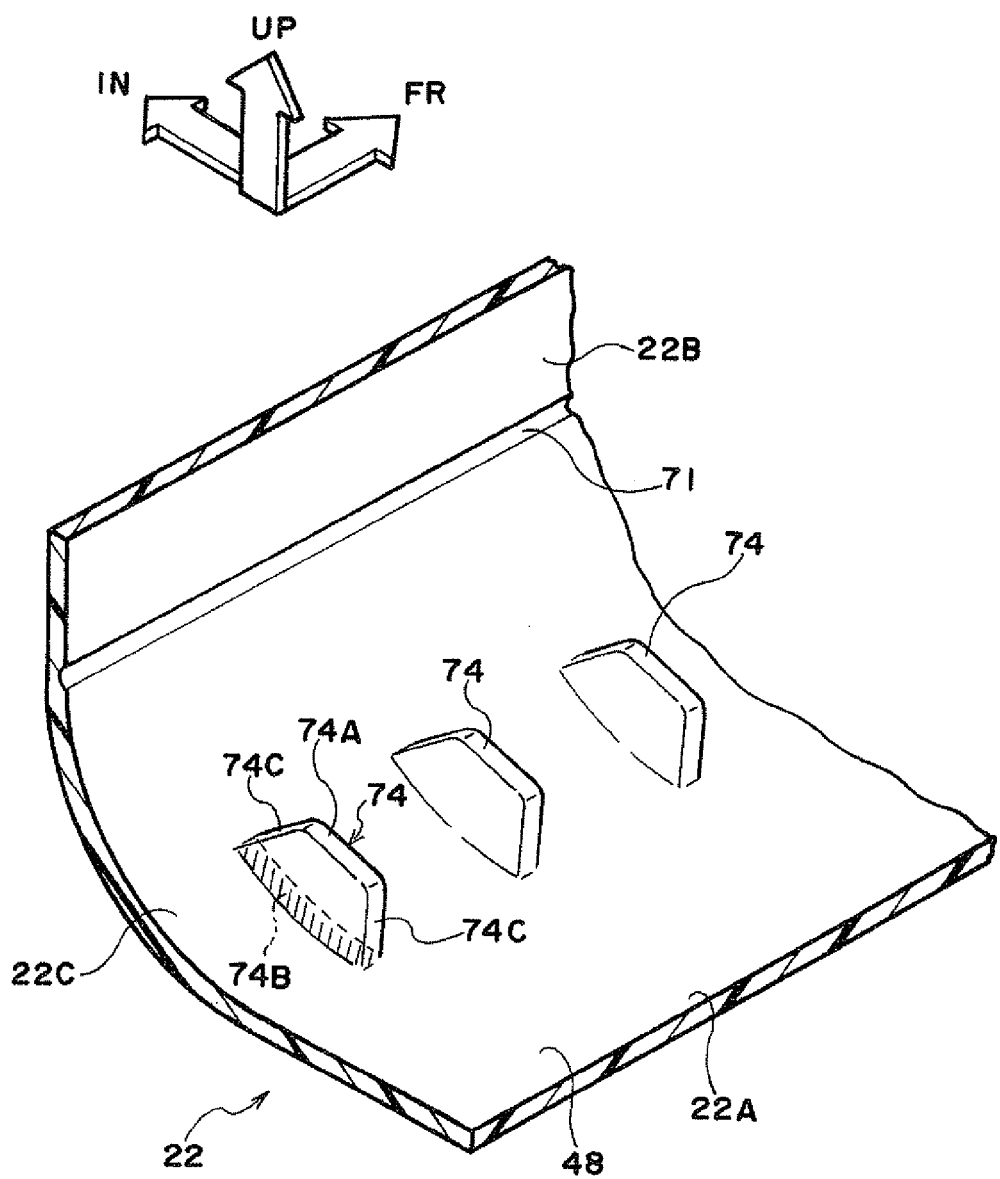
FIG. 3 is an enlarged perspective view showing, in an enlarged manner, ribs that are shown in FIG. 1.

As shown in FIG. 1 and FIG. 3, plural ribs 74, that serve as storage member side projecting portions, are provided to stand at the inner side surfaces of the corner portions 22C of the column lower cover 22 of the above-described structure. Note that the ribs 74 are formed only at the reverse surfaces of the airbag doors 48. Each of the ribs 74 is formed in an isosceles trapezoid shape as seen in the column axial direction, and is structured by an upper bottom portion (upper end portion) 74A, a lower bottom portion (lower end portion) 74B, and a pair of left and right inclined portions 74C.

Each of the ribs 74 is formed in a plate shape, and the plural ribs 74 are provided to stand at a predetermined pitch in the axial direction of the steering column 12. In the present embodiment, with three of the ribs 74 as a group, the ribs 74 are provided to stand at a total of three places that are the front side portion, the rear side portion, and the intermediate portion at the corner portion 22C of the airbag door 48, but the ribs 74 may be provided to stand at a predetermined pitch over the entire length, along the column axis direction, of the corner portion 22C of the airbag door 48. The shape, plate thickness, pitch, range of placement, density of placement, and the like of the ribs 74 can be set arbitrarily.

Further, a height h1 of the rib 74 from the inner side surface of the corner portion 22C is set to be higher than the gap dimension t1 of the gap 72. Accordingly, in the assembled state, the distal end portions (top end portions) of the ribs 74 at a total of six places that are provided to stand at the inner side surfaces of the left and right corner portions 22C bite-into the lower surface of the knee airbag 44 that is in the folded-up state.

(Operation and Effects of Present Embodiment)

When a vehicle in which the column-mounted knee airbag device 10 is installed front collides (or when a front collision is predicted), that state is sensed by an unillustrated collision sensing means, and a sensing signal is outputted to an airbag ECU. When airbag operation is decided upon at the airbag ECU, the airbag device at the driver's seat side operates, the airbag for the driver's seat is inflated on the steering wheel 30, and the column-mounted knee airbag device 10 also is operated. Namely, predetermined current is supplied to the ignition device of the inflator 42 of the column-mounted knee airbag device 10, and the inflator 42 is operated. Due thereto, gas is jetted-out from the gas jetting-out holes 52 of the gas jetting-out portion 42B of the inflator 42, and is supplied into the knee airbag 44 that is stored in a folded-up state. As a result, the knee airbag 44 inflates, and the inflation pressure thereof is applied to the airbag doors 48. When the inflation pressure that is applied to the airbag doors 48 reaches a predetermined value, of the rupture portion 70 that is formed at the reverse surfaces of the airbag doors 48, the longitudinal direction rupture portion 70A becomes the rupture starting point and is ruptured first. Thereafter, due to the pair of front and rear lateral direction rupture portions rupturing, the airbag doors 48 are unfolded to the right and left. Due thereto, the knee airbag 44 is inflated and expanded beneath and at the sides of the steering column 12, and the knee airbag 44 is interposed between the instrument panel 14 and the both knees of the vehicle occupant. As a result, the both knees of the vehicle occupant are received and protected by the knee airbag 44.

By the way, in a case in which the plural storage member side projecting portions of the present invention are not provided, when the vibrations at the time when the vehicle travels are transmitted to the airbag module via the steering column, abnormal noise due to the knee airbag hitting the storage member or the knee airbag rubbing against the storage member arises.

Here, in the present embodiment, the plural ribs 74 are provided to stand at the reverse surfaces of the airbag doors 48 that are formed at the column lower cover 22, and these ribs 74 are pressed against the lower surface of the knee airbag 44 that is in the folded-up state, and therefore, the knee airbag 44 and the column lower cover 22 are an interfering design. Thus, even if there is the gap 72 between the knee airbag 44 and the column lower cover 22, the knee airbag 44 is not displaced into this gap 72. Accordingly, the knee airbag 44 hitting the reverse surface of the column lower cover 22 and the knee airbag 44 rubbing against the reverse surface of the column lower cover 22 are suppressed or eliminated.

Further, as described above, because there is the gap 72 between the knee airbag 44 in the folded-up state and the column lower cover 22, a gap, that is necessary in a design that takes into consideration inconsistencies in the production of the parts such as the knee airbag 44 and the column lower cover 22 and the like, also is ensured as the gap 72.

As described above, in accordance with the present embodiment, even if there are inconsistencies such as manufacturing errors and assembly errors and the like of the respective parts, the occurrence of abnormal noise due to contact between the column lower cover 22 and the knee airbag 44 can be suppressed or prevented.

Further, in the present embodiment, because the ribs 74 are formed at the inner side surfaces of the corner portions 22C of the column lower cover 22, it is difficult for sink marks (depressions) and whitening of the design surface side to become noticeable. Accordingly, the above-described effects can be obtained without marring the quality of the external appearance of the column cover 18.

Moreover, in the present embodiment, because the knee airbag 44 has the pair of roll-folded portions 44A that are roll-folded such that the respective central lines Q of rolling thereof are disposed substantially parallel to the axis of the column tube 26, the knee airbag 44 is inflated and expanded at both vehicle transverse direction sides with the column tube 26 of the steering column 12 as the center. Accordingly, even if a gap 76 (see FIG. 2) between the both knees of the vehicle occupant and the instrument panel 14 is narrow, the knee airbag 44 is inflated and expanded rapidly in this gap 76.

Further, the inflator 42 is formed in a solid-cylindrical shape and is disposed between the pair of roll-folded portions 44A, or in other words, the inflator 42 is so-called longitudinally disposed such that the axial direction thereof is substantially parallel to the axis of the column tube 26, and therefore, it is easy to ensure space for setting the inflator 42 (the installation ability is good) at the narrow storage space 54 between the column tube 26 and the column lower cover 22. Moreover, because the gas jetting-out portion 42B of the inflator 42 is disposed between the pair of roll-folded portions 44A, gas is supplied uniformly to the pair of roll-folded portions 44A even if a flow adjusting means such as a diffuser or the like is not used. Accordingly, a left/right difference in the inflation pressure of the knee airbag 44 does not arise. For these reasons, in accordance with the present embodiment, the installation ability into the steering column 12 is good, and further, even if the gap 76 between the both knees of the vehicle occupant and the instrument panel 14 is narrow, the both knees of the vehicle occupant can be restrained rapidly and by pressures that are uniform at the left and the right.

Second Embodiment

Hereinafter, a second embodiment of the column-mounted knee airbag device relating to the present invention is described by using FIG. 4 through FIG. 6. Note that structural portions that are the same as the above-described first embodiment are denoted by the same numbers, and description thereof is omitted.

Figure 4:
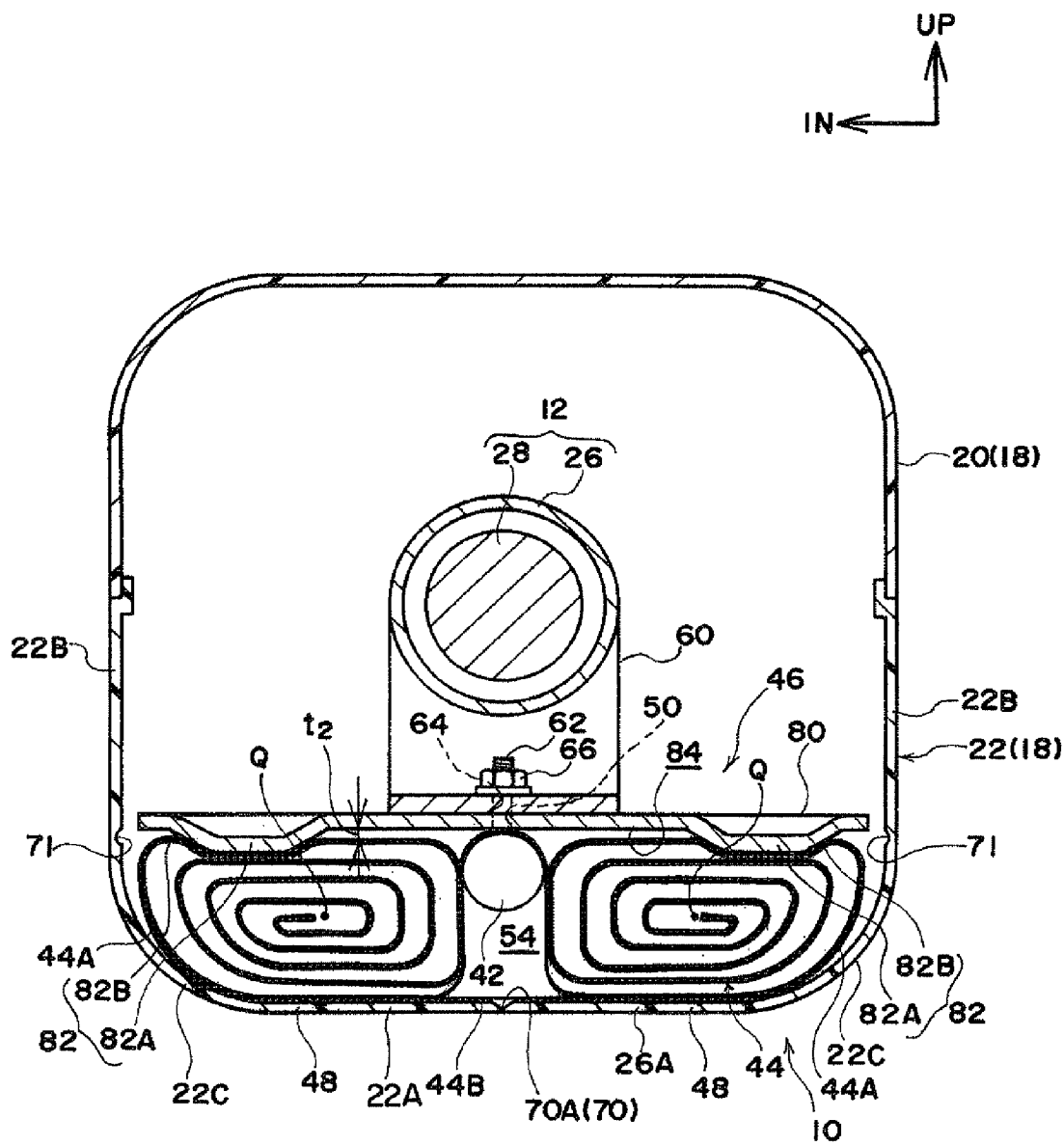
FIG. 4 is a vertical sectional view corresponding to FIG. 1 and showing the structure of main portions of a column-mounted knee airbag device relating to a second embodiment.
Figure 5:
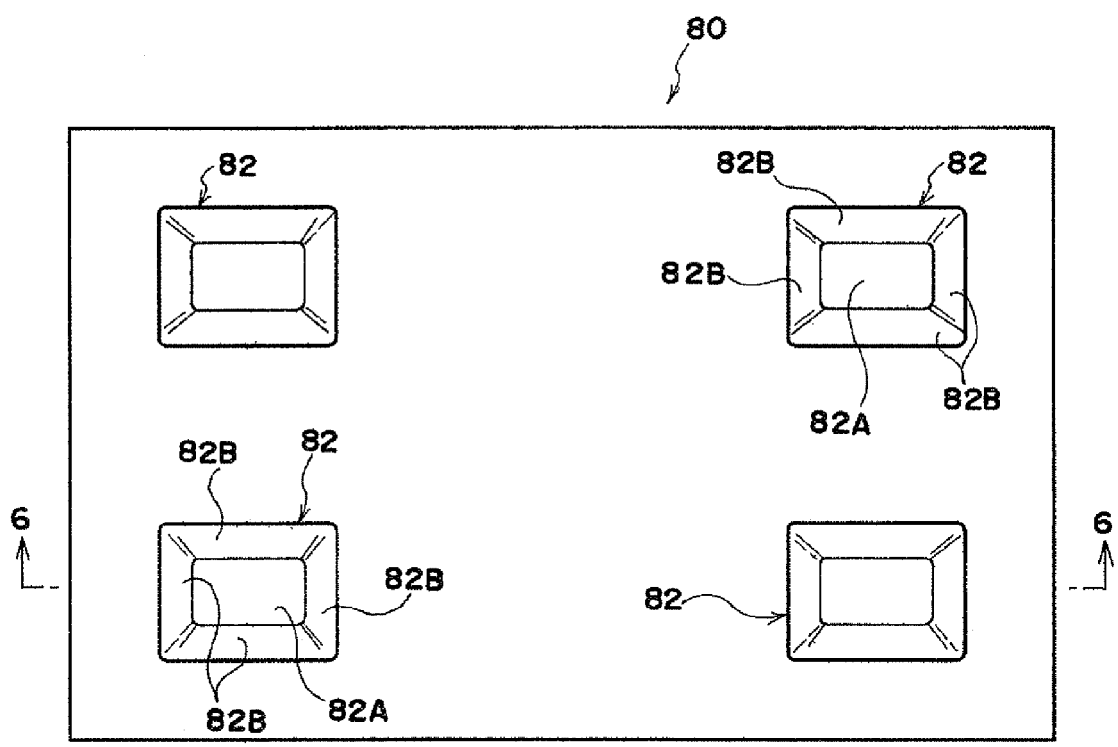
FIG. 5 is a plan view of a supporting plate shown in FIG. 4.
Figure 6:
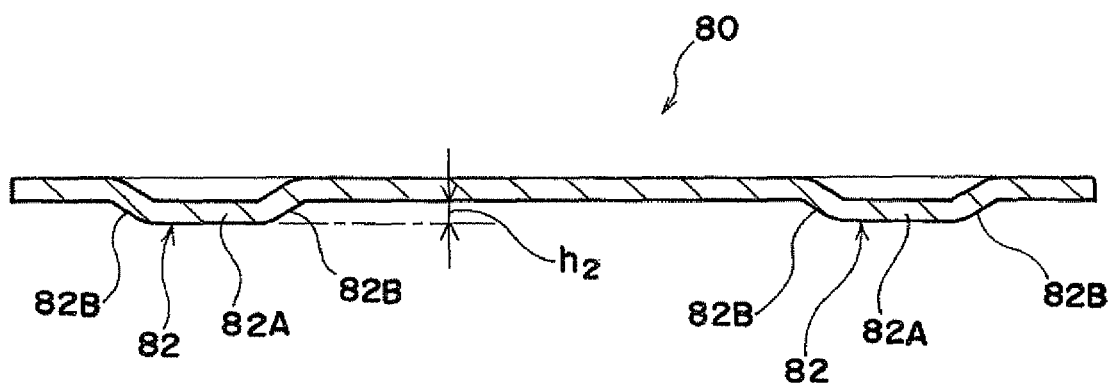
FIG. 6 is a sectional view showing a state of being cut along line 6-6 of FIG. 5.

As shown in FIG. 4 and FIG. 5, in the column-mounted knee airbag device 10 relating to this second embodiment, there is a feature in the point that plural convex portions 82 serving as supporting body side projecting portions are provided at a supporting plate 80 side that serves as a supporting body.

To describe concretely, the supporting plate 80 is formed in a rectangular flat plate shape, and convex portions 82, that project toward the column lower cover 22 side, are respectively formed in vicinities of the four corners thereof. Each of the convex portions 82 is formed in a rectangular shape in plan view. A distal end portion 82A of the convex portion 82 is formed in a rectangular flat surface shape, and the periphery thereof is structured by inclined surfaces 82B. Moreover, a projecting height h2 of the convex portions 82 is set to be higher than a gap dimension t2 of a gap 84 between the bottom surface of the supporting plate 80 that is described later and the top surface of the knee airbag 44. Further, the above-described convex portions 82 are formed integrally by press machining at the time of manufacturing the supporting plate 80.

In the assembled state of the airbag module 46, the distal end portions 82A of the above-described convex portions 82 are pressed against the top surface of the knee airbag 44 that is in the folded-up state. Further, the gap 84 of the gap dimension t2 is formed between the bottom surface of the supporting plate 80 and the top surface of the knee airbag 44. Moreover, in this state, the lower surface of the knee airbag 44 that is in the folded-up state tightly contacts the inner side surface of the column lower cover 22.

(Operation/Effects)

In accordance with the above-described structure, there is a structure in which the plural convex portions 82 that project toward the column lower cover 22 side are formed in vicinities of the four corners of the bottom surface of the supporting plate 80, and the distal end portions 82A of these convex portions 82 are pressed against the top surface of the knee airbag 44 that is in the folded-up state. Therefore, the knee airbag 44 is pressed against the inner side surface of the column lower cover 22. Thus, the lower surface of the knee airbag 44 tightly contacts the inner side surface of the column lower cover 22, and a gap between the both does not arise. Accordingly, the knee airbag 44 hitting the inner side surface of the column lower cover 22 and the knee airbag 44 rubbing against the inner side surface of the column lower cover 22 are suppressed or eliminated.

Moreover, by forming the convex portions 82 at the bottom surface of the supporting plate 80, the gap 84 that corresponds to the projecting height h2 of the convex portions 82 is formed between the top surface of the knee airbag 44 and the bottom surface of the supporting plate 80. Accordingly, a gap, that is necessary in a design that takes into consideration inconsistencies in the production of the parts such as the knee airbag 44, the column lower cover 22 and the like, is also ensured as the gap 84.

As a result, in accordance with the present embodiment, in the same way as the first embodiment, even if there are inconsistencies such as manufacturing errors and assembly errors and the like of the respective parts, the occurrence of abnormal noise due to contact between the column lower cover 22 and the knee airbag 44 can be suppressed or prevented.

Further, because the convex portions 82 are formed by press molding at the bottom surface of the supporting plate 80 that is made of metal, no special post-machining or the like arises, and the structure can be realized at a relatively low cost. Moreover, in a case in which convex portions are set at the column lower cover 22 side, there is the need to make it such that the effects of sink marks and whitening appear as little as possible at the design surface, but, in a case of providing convex portions at the supporting plate 80, there are no effects at all on the design surface of the column lower cover 22.

Third Embodiment

Hereinafter, a third embodiment of the column-mounted knee airbag device relating to the present invention is described by using FIG. 7 through FIG. 10. Note that structural portions that are the same as the above-described first embodiment or second embodiment are denoted by the same numbers, and description thereof is omitted.

Figure 7:
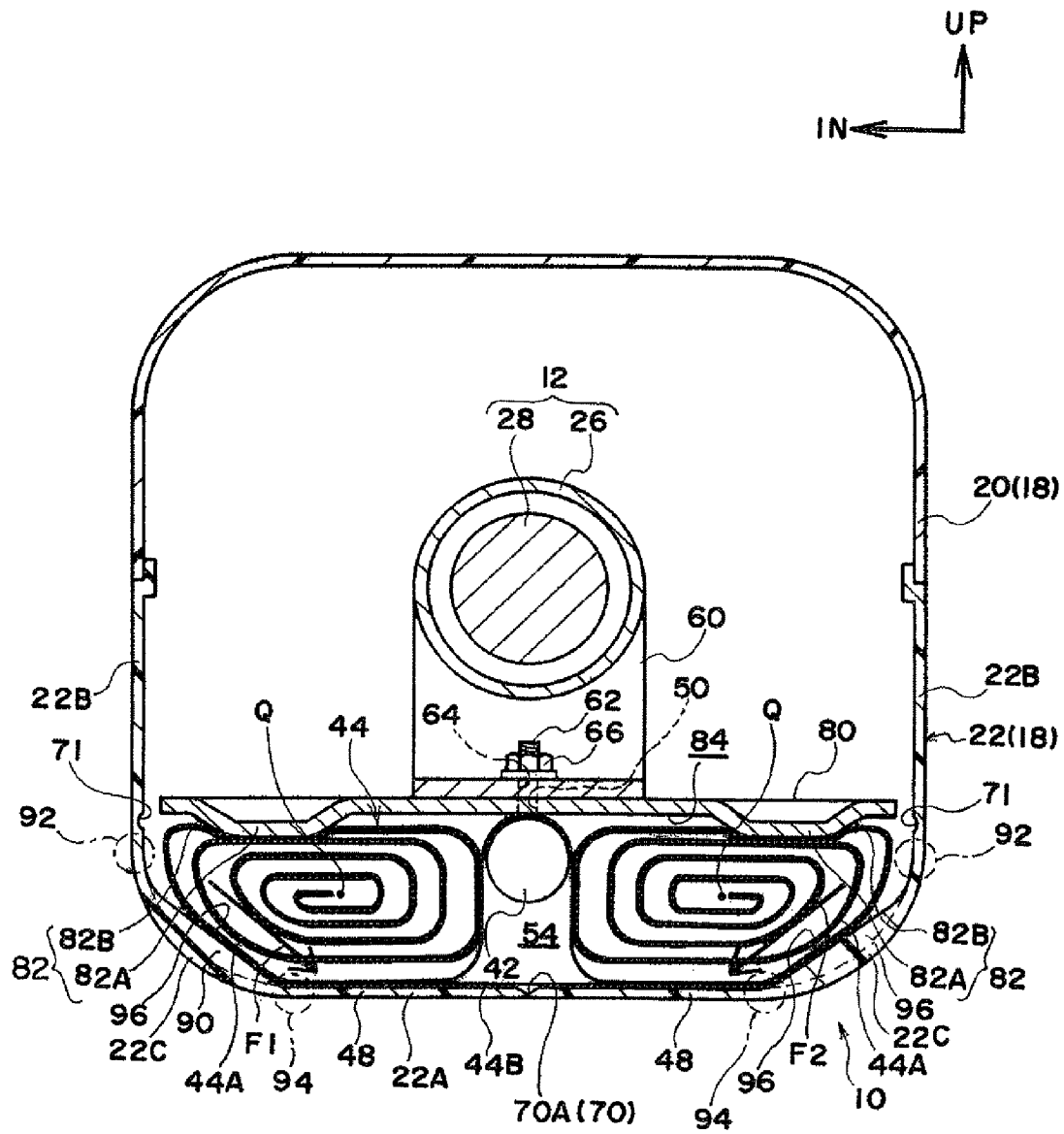
FIG. 7 is a vertical sectional view corresponding to FIG. 1 and showing the structure of main portions of a column-mounted knee airbag device relating to a third embodiment.

As shown in FIG. 7, the column-mounted knee airbag device 10 relating to this third embodiment is based on the structure of the second embodiment, and has a feature in the point that ribs 90, that correspond to the ribs 74 that were used in the first embodiment, are provided thereat. Accordingly, the column-mounted knee airbag device 10 has the supporting plate 80 that is rectangular plate shaped and at which the convex portions 82 are formed in vicinities of the four corners, and the plural ribs 90 that serve as storage member side projecting portions are provided to stand at the inner side surfaces of the corner portions 22C of the column lower cover 22. Further, the gap 72 does not exist between the lower surface of the knee airbag 44 and the bottom portion 22A of the column lower cover 22, and the gap 84 is provided between the top surface of the knee airbag 44 and the bottom surface of the supporting plate 80.

Figure 8:
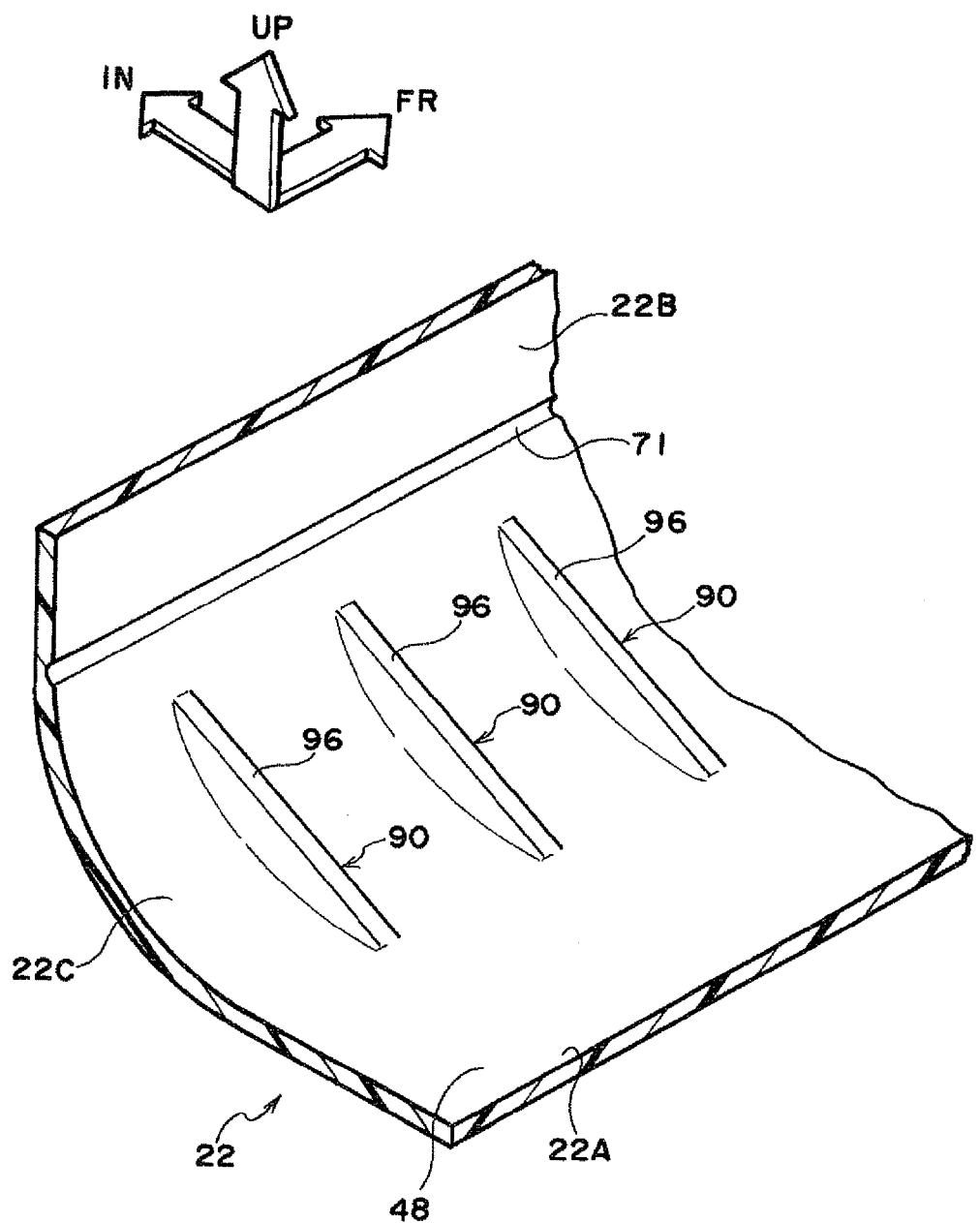
FIG. 8 is an enlarged perspective view showing, in an enlarged manner, ribs that are shown in FIG. 7.

To describe concretely, as shown in FIG. 7 and FIG. 8, the corner portion 22C is formed in a range from a first corner final end portion 92 that is the region connected with the side portion 22B (i.e., the region where the hinge 71 of the airbag door 48 is formed) to a second corner final end portion 94 that is the region connected with the bottom portion 22A. Note that the second corner final end portion 94 corresponds to the corner final end portion at the rupture starting point portion side in the present invention.

Further, the ribs 90 are set from a vicinity of the first corner final end portion 92 to the second corner final end portion 94. Moreover, the ribs 74 are formed in substantial half-moon shapes, and the surfaces thereof that face the knee airbag 44 are structured by inclined surfaces 96 that are single-surface structures that connect the vicinity of the first corner final end portion 92 with the second corner final end portion 94.

Note that, in the present embodiment, the ribs 90 are structured as described above, but it suffices for the ribs to extend at least to the second corner final end portion 94, and the ribs may extend so as to go somewhat beyond the second corner final end portion 94, and it suffices for the hinge 71 to be set at the upper side of the supporting plate 80 as seen in the drawing of FIG. 7, and the ribs may be set so as to extend from the first corner final end portion 92 to the second corner final end portion 94. Further, although the end portion, at the projecting direction side, of the rib 90 of the present embodiment is structured by the inclined surface 96 that is structured by a single flat surface, surfaces that are shapes that are similar thereto are included in the "inclined surfaces" of the present invention, even if it is a surface other than the inclined surface 96 that is structured by a single flat surface. For example, the end portion at the projecting direction side of the rib may be an inclined surface that resembles the inclined surface 96 of the rib 90 shown in FIG. 7, although it is structured by a curved surface that is gently curved. Moreover, even a rib of a three-surface structure, in which the majority of the end portion at the projecting direction side of the rib is an inclined surface of the same angle of inclination as the inclined surface 96 and only the both end portions of the rib are structured by inclined surfaces of different angles of inclination, can be applied provided that effects that are equivalent to or near to those of the present embodiment are obtained.

(Operation/Effects)

In accordance with the above-described structure, because it follows the structure of the above-described second embodiment, the convex portions 82 provided at the supporting plate 80 are pressed against the top surface of the knee airbag 44. Therefore, the lower surface of the knee airbag 44 tightly contacts the inner side surface of the column lower cover 22, and the gap 72 described in the first embodiment, that is a cause of abnormal noise, does not arise.

Further, because the gap 84 that was described in the second embodiment is ensured between the bottom surface of the supporting plate 80 and the top surface of the knee airbag 44, the gap that is needed in order to absorb manufacturing errors and assembly errors of the parts that arise during production is ensured.

Accordingly, in the present embodiment as well, even if there are inconsistencies such as manufacturing errors and assembly errors and the like of the respective parts, the occurrence of abnormal noise due to contact between the column lower cover 22 and the knee airbag 44 can be suppressed or prevented.

Further, in the present embodiment, in the same way as in the first embodiment, the ribs 90 are formed at the inner side surfaces of the corner portions 22C of the column lower cover 22, and these ribs 90 are pressed against the lower surface of the column lower cover 22, and therefore, the effect of making the column lower cover 22 and the knee airbag 44 be an interfering design also is obtained. Accordingly, in a case in which, for example, there is little pressing force by which the convex portions 82 at the supporting plate 80 side press the knee airbag 44 toward the column lower cover 22 side, the force by which the lower surface of the knee airbag 44 tightly contacts the inner side surface of the column lower cover 22 weakens, and the possibility arises, by that much, that a situation will occur in which the lower surface of the knee airbag 44 and the inner side surface of the column lower cover 22 rub, depending on the magnitude of the vibrations that are transmitted via the steering column 12. However, by providing the ribs 90 to stand at the inner side surfaces of the corner portions 22C of the column lower cover 22 and making them be a design that interferes with the knee airbag 44, it becomes difficult for the knee airbag 44 to rub against the inner side surface of the column lower cover 22 (it becomes difficult for the knee airbag 44 to move relatively). Accordingly, in accordance with the present embodiment, the occurrence of abnormal noise due to contact between the column lower cover 22 and the knee airbag 44 can be suppressed or prevented more effectively.

Figure 9:
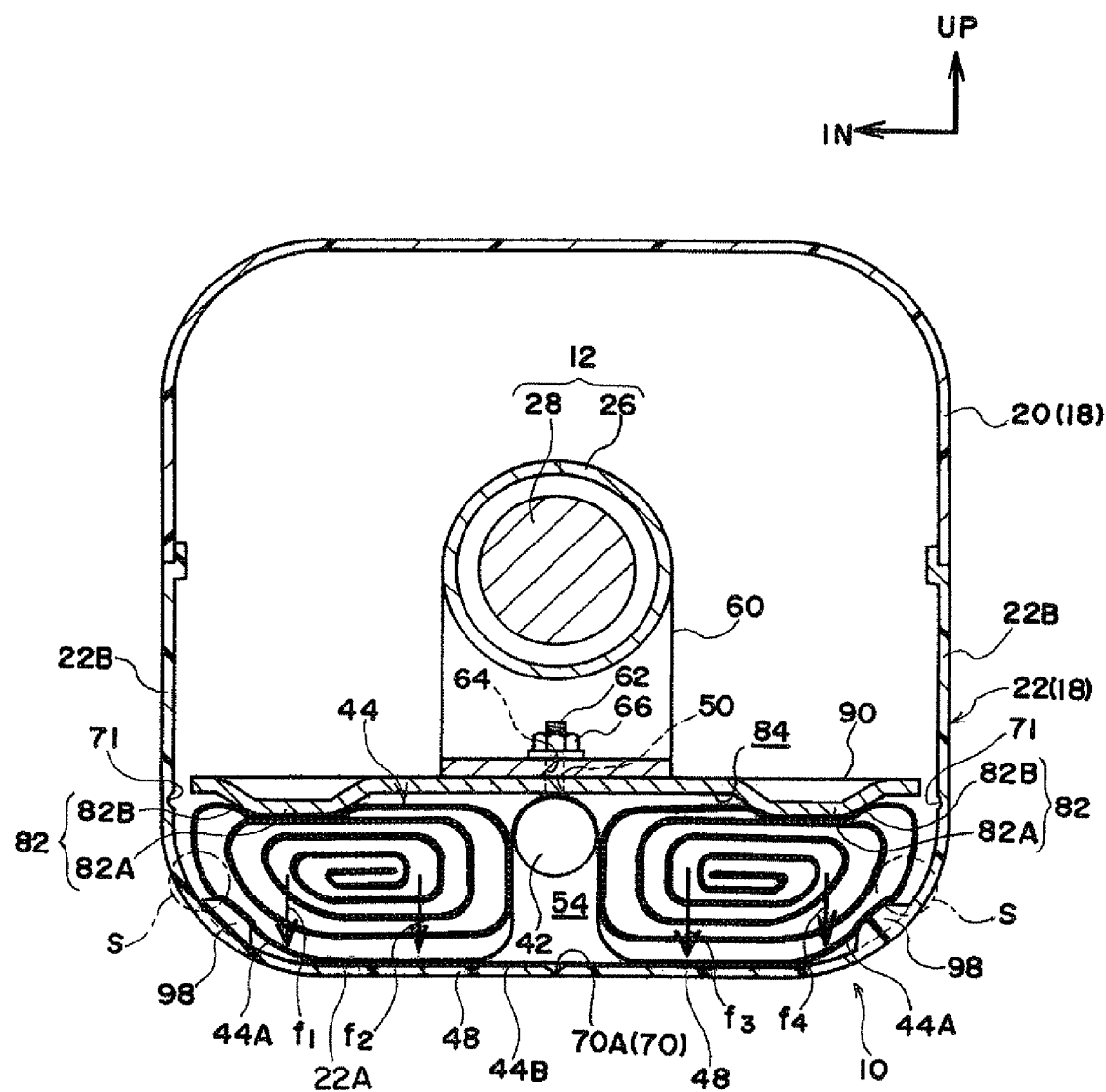
FIG. 9 is a vertical sectional view corresponding to FIG. 7 and showing a column-mounted knee airbag device relating to a comparative example.

Moreover, in the present embodiment, because the inner side end portions of the ribs 90 are set to the second corner final end portions 94 of the column lower cover 22, the stress that is due to the inflation pressure of the knee airbag 44 can be concentrated at the longitudinal direction rupture portion 70A that is the rupture starting point of the airbag doors 48. To describe in detail, if ribs 98, whose inner side end portions are not extended to the second corner final end portions 94 of the column lower cover 22 (i.e., that are short in the peripheral direction of the corner portions 22C), are set as shown in FIG. 9, the surface rigidity of the corner portions 22C of the column lower cover 22 increases in the ranges in which those ribs 98 are formed. Accordingly, inflation pressure f of the knee airbag 44 is applied to the reverse surface of the column lower cover 22 substantially uniformly between the left and right ribs 98 (refer to arrows f1 through f4). Therefore, the stress that is applied to the longitudinal direction rupture portion 70A also becomes a magnitude corresponding thereto.

In contrast, in the case of the present embodiment, because at least the inner side end portions of the ribs 90 are set to the second corner final end portions 94 of the column lower cover 22, the surface rigidity of the corner portions 22C is higher toward the longitudinal direction rupture portion 70A, as compared with the case of the ribs 98 of the structure shown in FIG. 9. Accordingly, inflation pressure F of the knee airbag 44 is applied toward between the left and right ribs 90 where the surface rigidity is relatively low (refer to arrows F1, F2), and the stress that is applied to the longitudinal direction rupture portion 70A concentrates by that much. As a result, in accordance with the present embodiment, the airbag doors 48 can be unfolded rapidly.

To supplementarily describe this effect, if the inner side end portions of the ribs 90 go beyond the second corner final end portions 94 and are set closer to the longitudinal direction rupture portion 70A, the surface rigidity increases more, and stress concentrates more at the longitudinal direction rupture portion 70A by that much. However, if the ribs 90 are excessively extended to the central portion side of the bottom portion 22A of the column lower cover 22, another problem of the storage space of the knee airbag 44 decreasing too much arises. Accordingly, extending the ribs 90 to the second corner final end portions 94 can strike a balance between improving the surface rigidity and ensuring the storage space, and is ideal.

Figure 10:
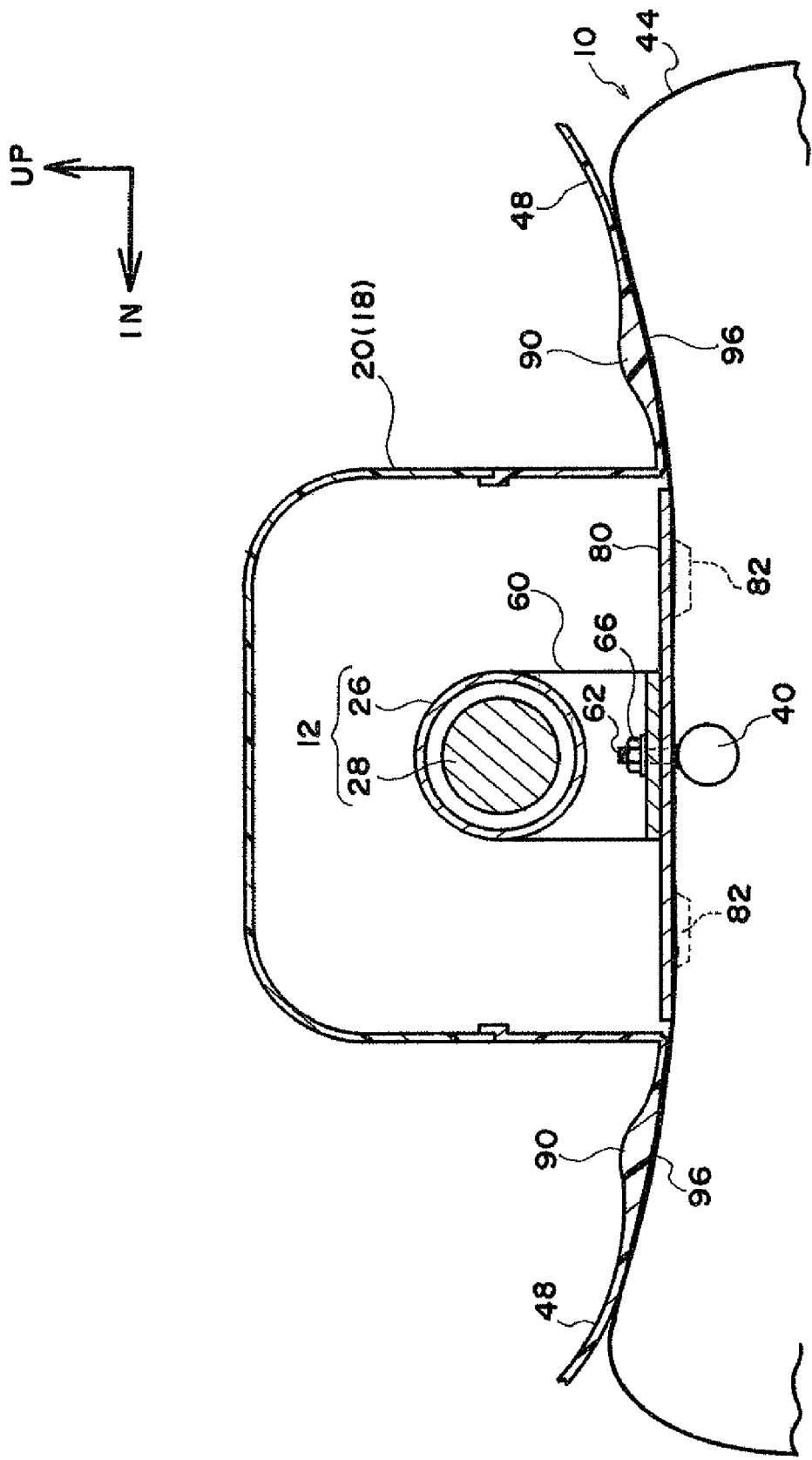
FIG. 10 is a vertical sectional view corresponding to FIG. 7 and showing the state at a time when airbag doors shown in FIG. 7 have unfolded and a knee airbag has inflated and expanded.

Further, in the present embodiment, because the ribs 90 are formed in substantial crescent shapes and the distal end portions thereof are made to be the inclined surfaces 96, the knee airbag 44 does not catch on the ribs 90 when the knee airbag 44 inflates within the column lower cover 22. Further, as shown in FIG. 10, the knee airbag 44 that inflates and expands does not catch on the ribs 90 at the time when the longitudinal direction rupture portion 70A ruptures and the airbag doors 48 unfold to the left and right.

For example, as shown in FIG. 9, in a case in which the surfaces pressed against the knee airbag 44 are not the inclined surfaces 96 such as those of the ribs 90 of the present embodiment, and the trapezoidal ribs 98 described in the above-described first embodiment are employed, there are cases in which the knee airbag 44 is pressed toward the column lower cover 22 side by the convex portions 82 at the supporting plate 40 side, and it can be supposed that, at the time of unfolding of the airbag doors 48, the knee airbag 44 expands while catching on vicinities (the S line arrow portions of FIG. 9) of the outer side end portions (the hinge 71 side end portions) of the ribs 98. However, when the ribs 90, whose distal end portions are structured by the inclined surfaces 96 of a one-surface structure, are used as in the present embodiment, the angle formed by the inner side surface of the column lower cover 22 and the rib 90 is near 180°, and therefore, the knee airbag 44 does not catch on the ribs 90 of the column lower cover 22. Accordingly, the expansion behavior of the knee airbag 44 from the start of expansion until the completion of expansion is stable. As a result, in accordance with the present embodiment, a vehicle occupant knee restraining performance that is stable is obtained.

Note that, in the present embodiment, the structure of extending the inner side end portions of the ribs 90 to the second corner final end portions 94, and the structure of pressing the knee airbag 44 by the single inclined surfaces 96, are added to a structure in which the ribs 90 at the column lower cover 22 side are added to the structure of the second embodiment in which the convex portions 82 are provided at the supporting plate 40. However, the present invention is not limited to the same, and the above-described structures may be applied to the structure of the first embodiment in which the ribs 74 are provided only at the corner portions 22C of the column lower cover 22.

Supplementary Description of Above Embodiments (1) The above-described respective embodiments are structured such that the column-mounted knee airbag device 10 operates due to a front collision, but are not limited to the same, and may be structured such that a pre-crash sensor is installed in the central portion or the like of the front bumper, and the column-mounted knee airbag device operates also when a front collision is predicted (foreseen).

(2) The above-described respective embodiments use the supporting plate 40 that is rectangular flat plate shaped, but are not limited to the same, and convex portions may be provided with respect to a module case of a shape in which the front and rear two sides, or the front, back, left, right four sides, of a rectangular flat plate are folded-over toward the column lower side. In this case, instead of the supporting plate 40, the module case corresponds to the supporting body of the present invention. Conversely, there may be a knee airbag device of a so-called case-less structure in which the module case itself is eliminated. In this case as well, because the knee airbag is stored within the column lower cover that serves as the storage member, there are the advantages of applying the present invention.

The invention claimed is:

1. A column-mounted knee airbag device comprising:
an airbag module structured to include a knee airbag that is disposed in a folded-up state at a lower rear end side of a steering column and that is inflated and expanded toward a lower side of the steering column due to gas being supplied;
a storage member that stores the airbag module between the storage member and the steering column, in a state in which there is a gap between the storage member and a lower surface of the knee airbag; and
a plurality of storage member side projecting portions that are provided at a surface of the storage member, which surface faces the knee airbag, the projecting heights of the projecting portions from the facing surface set to be higher than a gap dimension of the gap and the projecting portions being pressed against the knee airbag that is in the folded-up state.

2. The column-mounted knee airbag device of claim 1, wherein
the storage member is a column lower cover that covers a lower rear end side of the steering column and is structured to include a bottom portion and both side portions, and
the storage member side projecting portions are provided at corner portions at which the bottom portion and the side portions at the column lower cover are connected.

3. The column-mounted knee airbag device of claim 2, wherein a rupture starting point portion, that ruptures when inflation pressure of the knee airbag that is applied to the bottom portion reaches a predetermined value and unfolds airbag doors toward an outer side of the column lower cover, is set at a central side of the bottom portion of the column lower cover,
the corner portions are structured as regions that connect the bottom portion and the side portions at the column lower cover, and
further, the storage member side projecting portions are set at least to corner final end portions at rupture starting point portion sides of the corner portions.

4. The column-mounted knee airbag device of claim 2, wherein
surfaces, at a knee airbag side, of the storage member side projecting portions are structured by inclined surfaces that are inclined such that inner ends are positioned further toward a column lower side than outer ends, as seen from an axial direction of the steering column.

5. A column-mounted knee airbag device comprising:
an airbag module structured to include a knee airbag that is disposed in a folded-up state at a lower rear end side of a steering column and that is inflated and expanded toward a lower side of the steering column due to gas being supplied, and a supporting body that is supported at the steering column and to which the knee airbag is fixed;
a storage member that covers the airbag module from a column lower side and that stores the knee airbag between the storage member and the supporting body; and
a plurality of supporting body side projecting portions that are provided at a surface of the supporting body, which surface faces the knee airbag, and that project toward a storage member side, the projecting heights of the projecting portions from the facing surface set to be higher than a gap dimension of a gap between a top surface of the knee airbag and the supporting body, and that are pressed against the knee airbag that is in the folded-up state.

6. The column-mounted knee airbag device of claim 5, wherein
the storage member is a column lower cover that covers a lower rear end side of the steering column and is structured to include a bottom portion and both side portions, and
a plurality of storage member side projecting portions, that are pressed against the knee airbag that is in the folded-up state, are provided at a surface of the column lower cover, which surface faces the knee airbag.

7. The column-mounted knee airbag device of claim 6, wherein
the storage member side projecting portions are provided at corner portions at which the bottom portion and the side portions at the column lower cover are connected.

8. The column-mounted knee airbag device of claim 7, wherein
a rupture starting point portion, that ruptures when inflation pressure of the knee airbag that is applied to the bottom portion reaches a predetermined value and unfolds airbag doors toward an outer side of the column lower cover, is set at a central side of the bottom portion of the column lower cover,
the corner portions are structured as regions that connect the bottom portion and the side portions at the column lower cover, and
further, the storage member side projecting portions are set at least to corner final end portions at rupture starting point portion sides of the corner portions.

9. The column-mounted knee airbag device of claim 6, wherein
surfaces, at a knee airbag side, of the storage member side projecting portions are structured by inclined surfaces that are inclined such that inner ends are positioned further toward a column lower side than outer ends, as seen from an axial direction of the steering column.

10. The column-mounted knee airbag device of claim 1, wherein
the knee airbag has a pair of roll-folded portions that are roll-folded such that respective central lines of rolling are disposed substantially parallel to the steering column, and
the airbag module is structured to include the knee airbag, and a gas generating means that is formed in a solid cylindrical shape and is disposed between the pair of roll-folded portions and generates gas by operating.

* * * * *